US010361550B2

(12) United States Patent
Lindner et al.

(10) Patent No.: US 10,361,550 B2
(45) Date of Patent: Jul. 23, 2019

(54) PASSAGE OF A LINE THROUGH A WALL

(71) Applicant: NEXANS, Paris (FR)

(72) Inventors: Gerhard Lindner, Plossberg (DE); Hermann Teicher, Kohlberg (DE); Martin Reinwald, Freudenberg (DE)

(73) Assignee: NEXANS, Courbevoie (FR)

( * ) Notice: Subject to any disclaimer, the term of this patent is extended or adjusted under 35 U.S.C. 154(b) by 664 days.

(21) Appl. No.: 15/007,902

(22) Filed: Jan. 27, 2016

(65) Prior Publication Data
US 2016/0233658 A1    Aug. 11, 2016

(30) Foreign Application Priority Data

Feb. 5, 2015   (EP) ................................ 15305167

(51) Int. Cl.
*H02G 15/013*   (2006.01)
*B60R 16/02*    (2006.01)
(Continued)

(52) U.S. Cl.
CPC ....... *H02G 15/013* (2013.01); *B60R 16/0222* (2013.01); *F16L 5/10* (2013.01); *H02G 1/00* (2013.01)

(58) Field of Classification Search
CPC .... H02G 15/013; H02G 15/00; H02G 15/007; H02G 15/04; H02G 1/00; H02G 3/00;
(Continued)

(56) References Cited

U.S. PATENT DOCUMENTS 5,562,292 A * 10/1996  Roy .................... B60R 16/0222
                                                      277/634
6,815,615 B1 * 11/2004  Haulotte ............. B60R 16/0222
                                                      174/152 G
(Continued)

FOREIGN PATENT DOCUMENTS

JP   H11 341651      12/1999
JP   2001176346      6/2001

OTHER PUBLICATIONS

Search Report dated 2015.

*Primary Examiner* — Angel R Estrada
(74) *Attorney, Agent, or Firm* — Sofer & Haroun, LLP

(57) ABSTRACT

An arrangement for a moisture tight passing of a line (14) through a wall is indicated. The arrangement includes a line (14) surrounding the passage (1) in the mounted position. The passage (1) has an approximately sleeve shaped housing (2) with an interrupted sleeve shape opening (9) that can be placed in the radial direction on the finished line (14). The passage (1) further has a sealing element (3) which has a ring shaped part (5) and a web (4) which protrudes in the axial direction from the ring shaped part which tightly closes the opening (9) of the housing (2) in the mounted position. The web (4) has a slot (7) extending in its longitudinal direction, which at its one end is open toward the outside and the other end ends in a hole (6) in which the line (14) is located tightly surrounded after pushing the sealing element (3) radially on the same in the mounted position. The ring shaped part (5) of the sealing element (3) is, after assembly of the housing (2), secured to the outer surface thereof.

6 Claims, 2 Drawing Sheets

(51) Int. Cl.
*F16L 5/10* (2006.01)
*H02G 1/00* (2006.01)

(58) Field of Classification Search
CPC .. H02G 3/04; H02G 3/22; H02G 3/24; H02G 3/26; H02G 3/30; H02G 3/36; B60R 16/0222; B60R 16/0207; B60R 16/00; F16L 5/10; F16L 7/00; F16L 7/02
USPC ........ 174/650, 135, 72 A, 68.1, 68.3, 152 G, 174/153 G, 152 R, 137 R, 138 R, 142, 174/663; 16/2.1, 2.2; 277/312, 314, 616; 248/56; 439/271, 272
See application file for complete search history.

(56) References Cited

U.S. PATENT DOCUMENTS

| | | | | |
|---|---|---|---|---|
| 7,348,491 | B2 * | 3/2008 | Fuller | B60R 16/0222 174/152 G |
| 7,641,271 | B1 * | 1/2010 | Haydin | B60R 16/0222 16/2.1 |
| 7,930,800 | B1 * | 4/2011 | Castrale | F16L 5/10 16/2.2 |
| 8,022,304 | B2 * | 9/2011 | Baydoun | H02G 3/22 16/2.2 |
| 8,981,228 | B2 * | 3/2015 | Okuhara | B60R 16/0222 174/152 G |
| 9,365,170 | B2 * | 6/2016 | Gronowicz, Jr. | B60R 16/0222 |
| 9,647,438 | B2 * | 5/2017 | Scheuer | B60R 16/0222 |

* cited by examiner

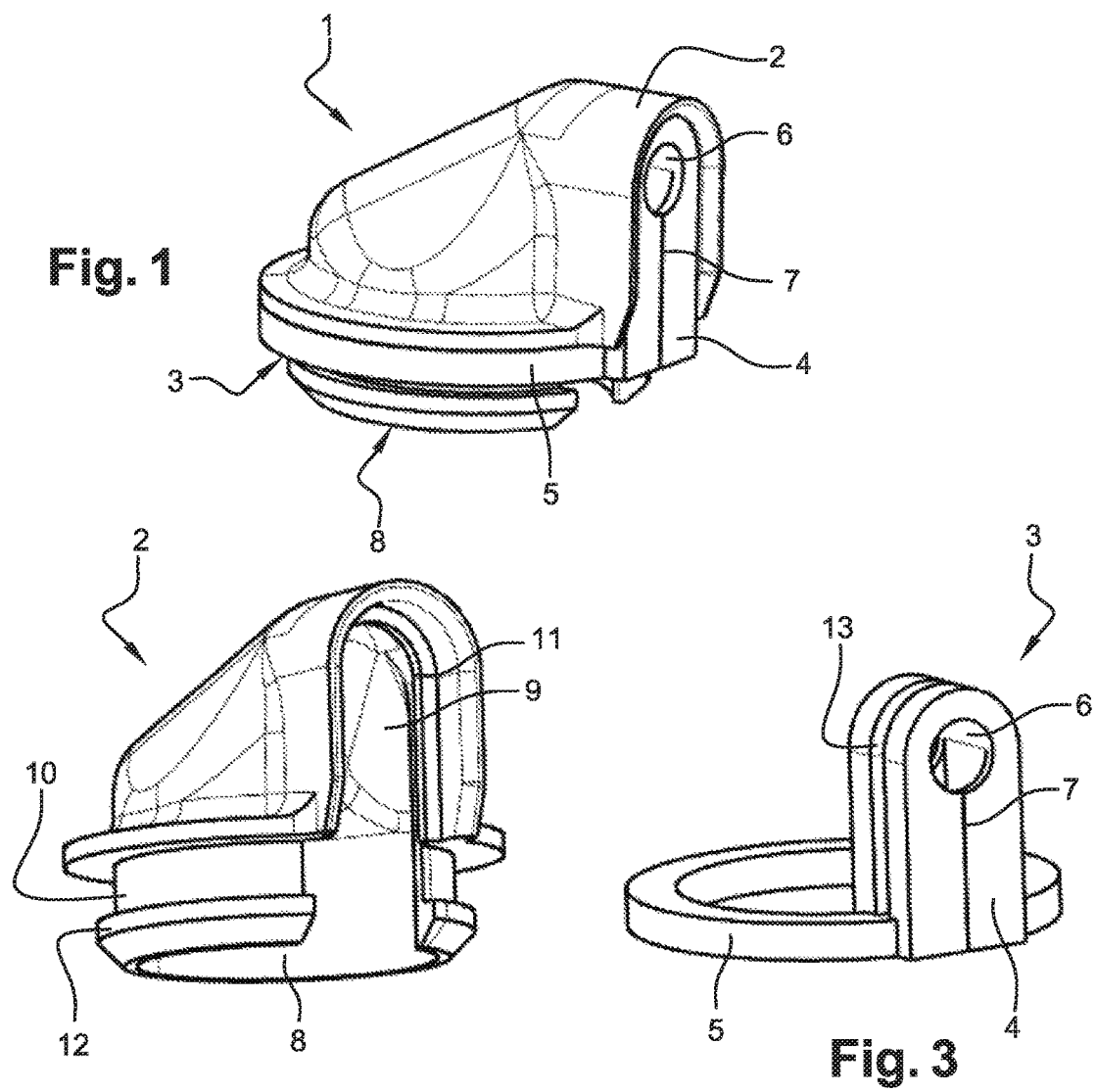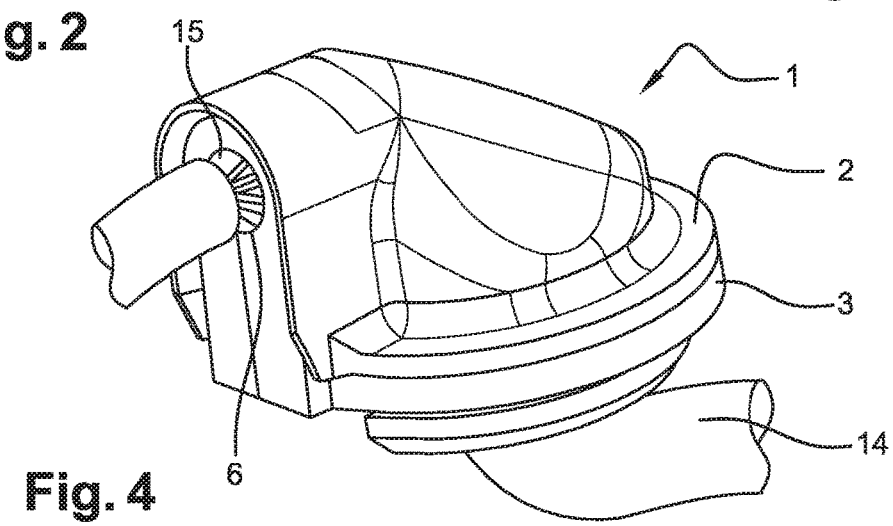

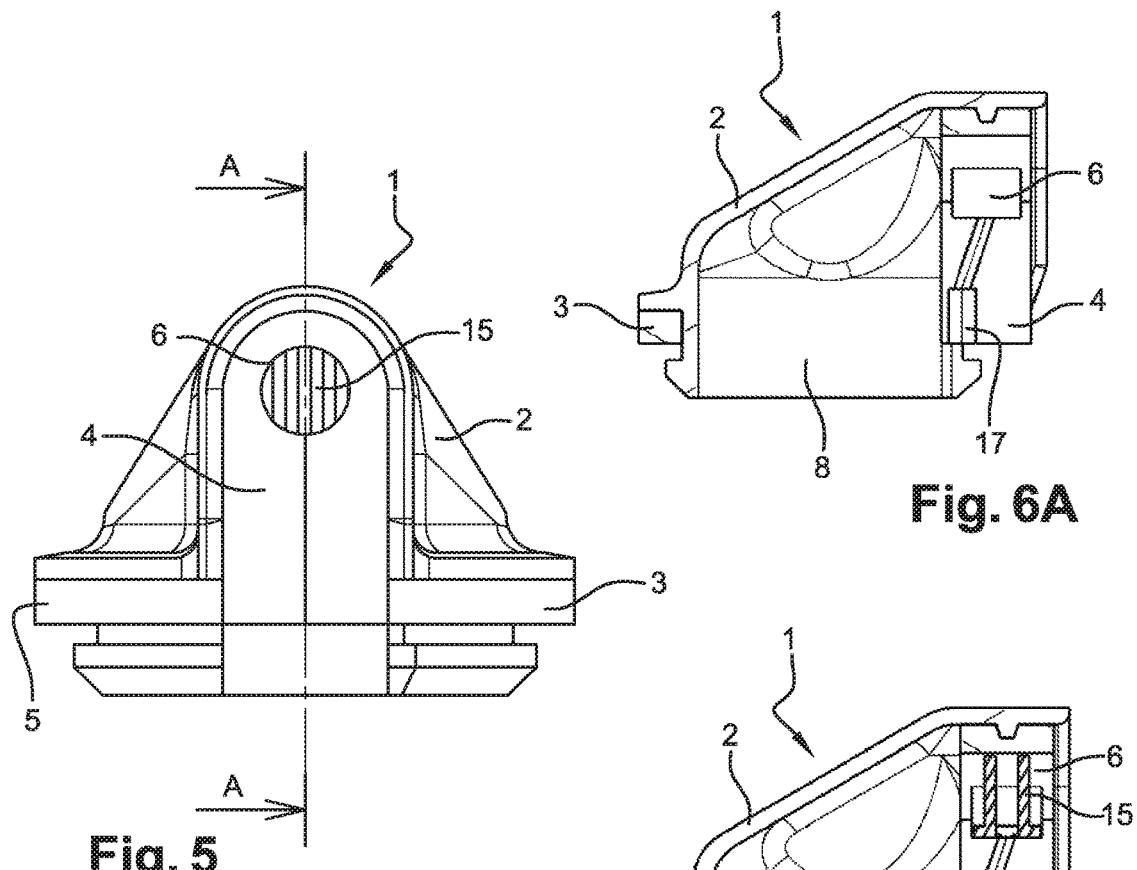
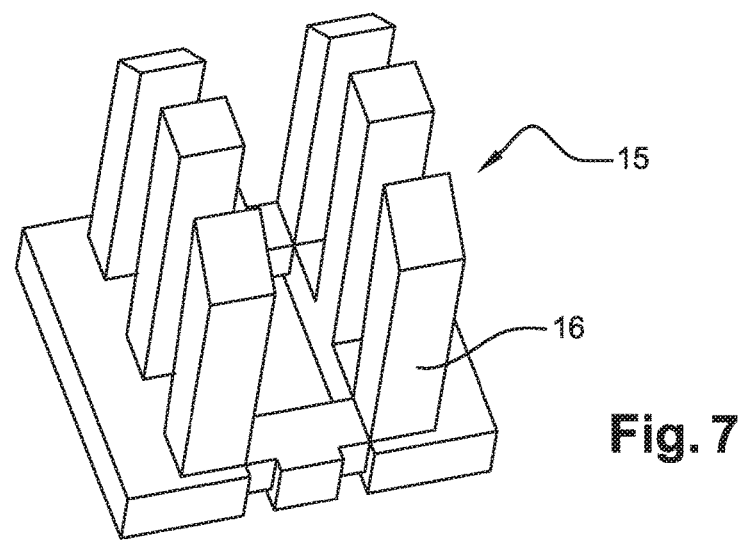

PASSAGE OF A LINE THROUGH A WALL

RELATED APPLICATION

This application claims the benefit of priority from European Patent Application No. 15 305 167.7, filed on Feb. 5, 2015, the entirety of which is incorporated by reference.

BACKGROUND

Field of the Invention

The invention relates to an arrangement for passing a line through a wall in a moisture tight manner, wherein the arrangement comprises a passage surrounding the line in the mounted position, as well as to a corresponding method. In the following, the term line is intended to be referred to as a single line as well as to sets of lines.

Description of Related Art

In particular in a motor vehicle, a plurality of different lines are used. For example, electrical elements or devices must be supplied with current. Among the electrical elements are, for example, the light diodes in headlights or rear lights, motors to raise and lower the windows, for controlling the rear view mirrors, illumination of the dashboard, sensors and control devices. Other systems, for example the windshield wiper system, must be supplied with liquid. By means of electrical lines, the electrical elements are, in the known manner, frequently combined in cable trees or cable sets connected to a central unit arranged in the chassis. The cable sets may also contain signal lines. Liquids must be transported by means of flexible or rigid lines.

Frequently, the lines must be placed in a motor vehicle in various areas and can extend across these various areas. For example, the lines extend through sealed dry areas and non-insulated areas permeable to water of the chassis. The lines must pass through areas hermetically sealed from one another by separating walls. For example, there is a dry area in a motor vehicle door in which moisture can enter underneath the raising and lowering windowpane. The lines can also be passed through an outer wall, for example, by trailer hitches or by supply mounted illuminating systems.

The separating walls between such different areas, which for example consist of the sheet metal of the vehicle chassis, where the outer walls must be traversed by the line without the hermetically sealed separation between the different areas being impaired. In order to ensure a sealed passage, for example, simple rubber sleeves or multipart plastic passages are used which are placed on the line before the installation or the completion of the same. The passage through the wall or the separating wall can also be foamed with insulation material.

EP 2 008 875 A1 describes a passage for an electrical line through a wall of an electrical device which is composed of an adapter, a sealing ring and a clamping member. The adapter has a pipe piece which extends through the hole in the wall and a flange which is fixed to the wall by means of being bolted, locked into place or bayonet fitted. The pipe piece has an expanded portion which extends into the interior of the device, wherein a comb shaped component (the clamping member) can be engaged, wherein the comb shaped member serves to separate the lines within the passage.

OBJECTS AND SUMMARY

The invention is based on the object of providing a moisture proof passage of a line in a motor vehicle which can be mounted in a simple manner and subsequently, i.e. after the manufacturing process of the line has been finished.

In accordance with the invention, this object is met in that the passage has an approximately sleeve shaped housing with an opening which interrupts the sleeve shape at a location and which can be placed on the finished line in the radial direction, furthermore, the passage has a sealing element that consists of a ring shaped member and of a web protruding in the axial direction from the ring shaped member, wherein the ring shaped member tightly closes the opening of the housing in the mounted position, the web has a slot extending in its longitudinal direction, wherein the end of the slot in the area of the ring shaped member is open to the outside and its other end ends in a hole in which the line in the mounted position slides the sealing agent in the radial direction to tightly surround the hole, and after the assembly of the housing, the ring shaped part of the sealing element, after mounting the housing, is secured on the outer surface thereof.

The passage according to the invention permits a dust free and moisture free passage of any chosen line through a wall, for example, a separating wall or an outer wall of a motor vehicle body. The passage consists advantageously of only two parts. Accordingly, it is possible to mount it in a very simple manner. Additionally, it can advantageously be mounted on a finished line or a finished cable tree, for example, after the line has already been installed in the motor vehicle. This is achieved by the open shapes of the housings and of the sealing elements. Therefore, it is no longer necessary to thread the line into a sealing element or a passage. The passage is distinguished by the presence of the housing in addition to the sealing element, additionally through an especially high load bearing capacity. The passage has the additional advantage that it can be mounted subsequently, for example, for repair purposes without having to remove the line or the line assembly.

In accordance with a preferred embodiment, the hole of the web of the sealing element around the line is filled with a sealing material. This can be, for example, an industrial foam. This further increases the moisture proofing of the assembly.

The line may consist of a cable tree or line set with a plurality of individually insulated lines. In accordance with a further preferred embodiment, the passage has an insert part which is arranged in the hole of the sealing element and is suitable to guide the individual insulated lines through the hole of the insulated element. In that case, the passage consists of three parts. In the case of more than three parts, a comb shaped insert part prevents especially a nest formation in the passage when filling in the sealing material.

BRIEF DESCRIPTION OF THE DRAWINGS

Embodiments of the subject matter of the invention are illustrated in the drawings. In the drawings:

FIG. 1 is a perspective view of a passage according to the invention,

FIG. 2 is a perspective view of a housing of the passage according to a first embodiment, FIG. 3 is a perspective view of a sealing element of the passage according to the first embodiment, FIG. 4 is a perspective view of a passage according to the invention with a line set extending therethrough, FIG. 5 is a side view of a passage according to a second embodiment, FIG. 6A is a sectional view through the passage according to the first embodiment, FIG. 6B shows a sectional view through the passage according to the second embodiment, FIG. 7 is a perspective view of an insert part of the passage according to the invention.

In the drawings, equal reference numerals refer to the same technical features.

DETAILED DESCRIPTION

In FIG. 1 a passage 1 according to the invention for passing a line through a wall according to a first embodiment is shown. The passage 1 consists of a housing 2 and a sealing element 3. For a better overview, the housing 2 and the sealing element 3 are each illustrated individually in FIGS. 2 and 3.

The housing 2 has a curved approximately pipe shaped sleeve like form. The housing 2 has two interconnected openings 8, 9 through which the line, for example, a cable set, is guided. The part of the housing 2 which is located in a first circular opening 8 is intended to be mounted in an opening in a wall. This wall (not illustrated) can, for example, be a separating wall or an outer wall in a motor vehicle chassis. The second sleeve like opening 9 of the housing 2 serves for receiving the line in the passage 1. The housing 2 is preferably composed of synthetic material, for example, of polyamide, polypropylene or another similar synthetic material.

The sealing element 3 is composed in the illustrated embodiment essentially out of a ring formed part or sealing ring 5. A web 4, axially protruding from the sealing ring 5, has a hole 6 or a passage for the lines and a slot 7. The slot 7 is at its one end in the area of the ring shaped part 5 outwardly open and ends at its other end in the hole 6. The line is passed through the hole 6 in the mounted position, into the housing 2 tightly surrounding the line. The sealing element 3 consists of silicon or of synthetic caoutchouc such EPDM. Consequently, the slot 7 can be easily opened as long as the sealing element 3 is not mounted with the housing 2. By opening the slot 7, the web hole 6 becomes interconnected with the opening of the sealing ring 5.

Due to the interconnected openings 8, 9 of the housing 2 and the expandable slot 7 in the web 4 of the sealing element 3, it is advantageously possible to mount the passage according to the invention afterwards on a previously installed line and/or with a plug or similar line. It is not necessary to thread the line into the passage 1.

In the mounted or working position the sealing element 3 is supported by the housing 2. In the mounted position, the housing 2 itself is arranged in the wall opening. The sealing ring 5 of the sealing element 3 lies, in this connection, in one of the first openings 8 of the housing 2, in a depression or depression 10 on the outside of the housing 2. Also in the depression 10 extends the rim of the wall, in which the passage 1 is mounted in the working position. In this connection, the rim of the wall between the elastic sealing ring 5 and a projection 12, which is formed by the depression 10, is clamped. Consequently, the passage of the housing 2 through the wall opening is completely sealed off.

In the illustrated embodiment the second opening 9 of the housing 2 has a projection 11 which extends within the circumference of the opening 9. In the working position, this projection 11 cooperates with a groove 13 partially surrounding the web 4 of the sealing element 3. Consequently, this opening 9, or the passage of the line through the housing 2, is closed off by the sealing element 3. The second housing opening 9 surrounds the web 4 in the working position. Consequently, the sealing element 3 also extends into the inner housing 2. In the working position the slot 7 of the web 4 of the sealing element 3 of the housing 2 is closed.

FIG. 4 shows the passage 1 according to the invention with a line 14 extending therethrough for illustrating the arrangement in the working position. The wall is not illustrated. The line 14 is a cable set or line set in the illustrated case. In FIG. 4 the individual cables or insulated lines of the cable sets 14 are secured at the entrance 15 of the cable sets 14 in the web opening 6 of the sealing element 3.

FIG. 5 shows a side view of the passage 1 according to the invention in a second embodiment. The second embodiment differs from the first in that the web 4 of the sealing element 3 contains an insert 15. The insert 15 is individually illustrated in FIG. 7. It is arranged inside the web opening 6. The insert 15 serves to guide the individually insulated lines of the cable sets separately through the web opening 6. For this purpose, the individual insulated lines are each placed or clamped between the pins 16 of the comb like inserts 15. Due to the fixed separate arrangement of the lines a nest like formation is counteracted.

FIGS. 6A and 6B each show a sectional view of the passage 1 according to the invention along the dotted line A-A illustrated in FIG. 5. In contrast to the passage 1 illustrated in FIG. 6A, the passage 1 illustrated in FIG. 6B contains an insert 15.

The diameter of the line passage or the opening 6 in the web 4 of the sealing element 3 is adapted to the diameter of the line to be conducted therethrough. In accordance with a particularly preferred embodiment, the inner area of the web 4 is filled with a sealing material. The web opening 6 of the sealing element 3 is particularly filled out completely with sealing material. For example, the sealing material may be an industrial foam which is injected into the web 4. For this purpose, as illustrated in FIGS. 6A and 6B, the web 4 can be provided with injection opening 17. The sealing foam penetrates through the injection opening 17 up to the web opening 6 and fills all free spaces between the line and the opening rim. The sealing foam then hardens directly an the web 4 without having to take additional technical measures, for example, thermal processes.

This embodiment is particularly advantageous for the passing through of a cable set. The individual insulated lines are, for example, guided by means of the insert parts 15 separately through the hole 6 of the web 4. Through this aligned arrangement of the lines a nest formation of the lines is counteracted which could prevent the complete foaming of the lines. As a result of the previous assembly of the insert part 15, a complete, clean spraying of each individual insulated line is ensured. Simultaneously, as a result of the spraying of the sealing material the slot 7 in the web 4 is additionally tightly closed.

For example, the passage 1 is mounted as follows: Initially the sealing element 3 is pushed radially onto the line 14, so that the line 14 slides longitudinally through the slot 7 until the line 14 is located in the hole 6 of the web 4 of the sealing element 3. In the case of a line set 14 initially the individual lines are placed between the pins 16 or comb like insert parts 15, so that the lines are separated without intersecting and then the sealing element is pushed radially on the insert part 15 so that the insert part 15 slides longitudinally through the slot 7 until it lies together with the lines in the hole 6 of the web 4. Subsequently, the housing 2 is also slid in the radial direction onto the line 14. Consequently, the ring shaped part 5 of the sealing element 3 is snapped onto the housing 2 until it sits tightly in the circumferentially extending depression 10. Simultaneously, the web 4 of the sealing element 3 is pressed into the opening 9 of the housing 2, so that the projection 11 of the web 4 snaps into the groove 13 of the opening 9. This causes the web 4 to tightly close the opening 9. The hole 6 of the web 4 can then eventually, for example, be injected with industrial foam as explained above. Subsequently, the whole assembled passage 1 is fixed in the wall hole so that the rim of the hole is located within the depression 10 of the housing 2.

The invention claimed is:

1. Arrangement for moisture tight passage of a line through a wall comprising:
    a line;
    said line surrounded by a passage in the mounted position, wherein the passage has an approximately sleeve shaped housing at a location with an opening which has an interrupted sleeve shape and which can be placed in the radial direction on the finished line,
    wherein the passage, furthermore, has a sealing element which has a ring shaped part and of a web projecting in the axial direction which tightly closes the opening of the housing in the mounted position,
    wherein the web has on its one end in the area of the ring shaped part,
    wherein the web has a slot extending in its longitudinal direction, with the end of the slot in the area of the ring shaped part being open to the outside and its other end ends in a hole in which the line in the mounted position slides the sealing element in the radial direction to tightly surround the hole, and
    wherein after the assembly of the housing, the ring shaped part of the sealing element, after mounting the housing, is secured on the outer surface thereof.

2. Arrangement according to claim 1, wherein the hole of the web of the sealing element is filled out around the line with a sealing material.

3. Arrangement according to claim 2, wherein the sealing material is an industrial foam.

4. Arrangement according to claim 1, wherein the line is comprised of a cable tree with a plurality of insulated lines, and that furthermore, the passage includes an insert part in the hole of the sealing element arranged and suitable to guide the individual and insulated lines separately through the hole of the sealing element.

5. Arrangement according to claim 1, wherein the sealing element has an elastic material.

6. Arrangement according to claim 1, wherein the housing has polyamide or polypropylene.

* * * * *